UNITED STATES PATENT OFFICE.

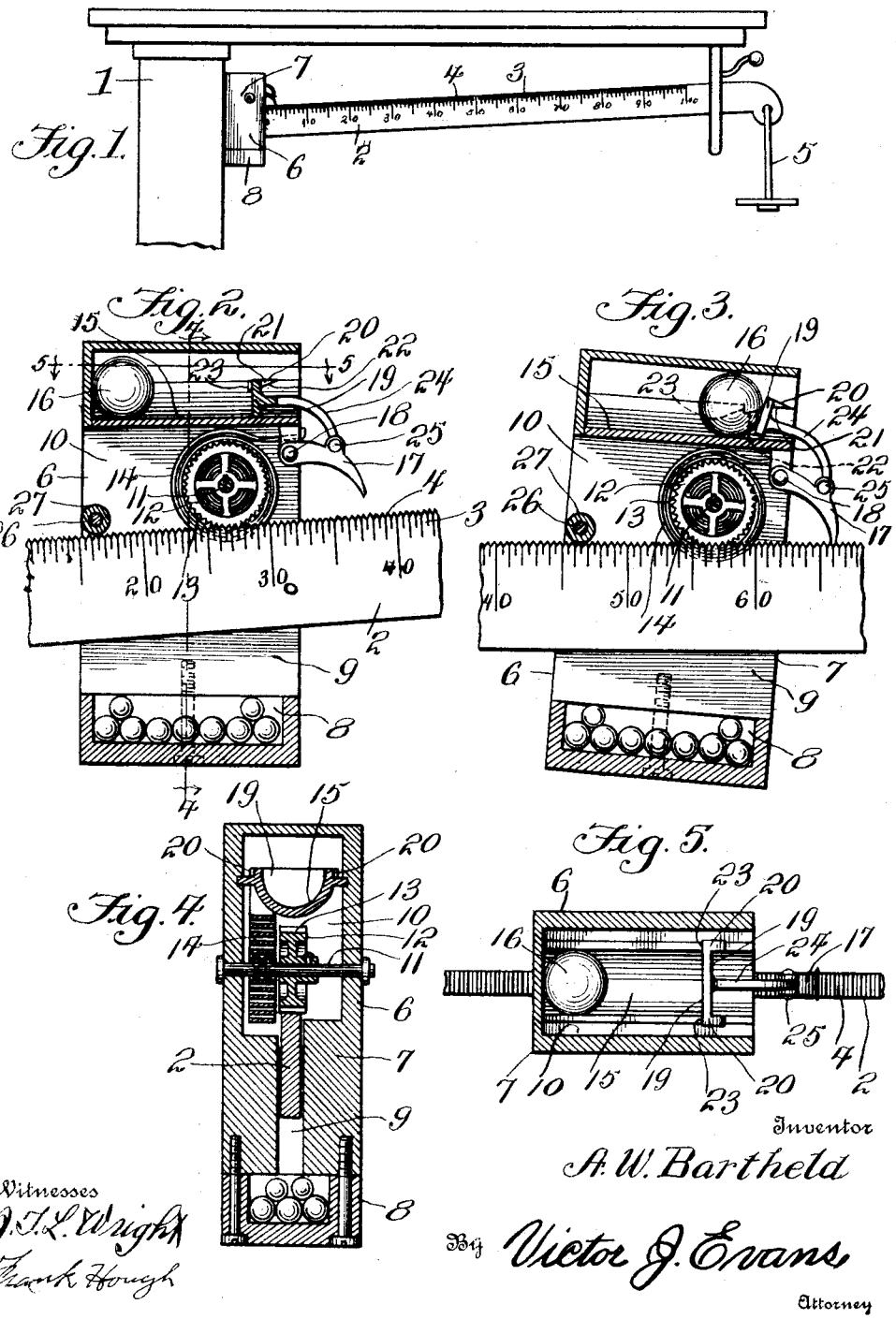

ALVIN WENZEL BARTHELD, OF BEACH, NORTH DAKOTA.

SCALE-WEIGHT.

1,217,687.  Specification of Letters Patent.  Patented Feb. 27, 1917.

Application filed June 2, 1916.  Serial No. 101,352.

*To all whom it may concern:*

Be it known that I, ALVIN W. BARTHELD, a citizen of the United States, residing at Beach, in the county of Golden Valley and State of North Dakota, have invented new and useful Improvements in Scale-Weights, of which the following is a specification.

This invention relates to a scale weight and more particularly to a weight which when applied to a scale beam may be used as a poise.

The primary object of the invention is to provide a scale weight of the class described having mechanism arranged therein for connection with a scale beam and operable when the scales are being used to cause the weight to travel along the beam until the scales accurately balance thereby obviating the necessity of manually adjusting the weight along the beam to produce this result.

Another object of the invention is to provide the scale weight with mechanism for causing the same to travel along the scale beam when the scale is in use which is operable under the influence of a spring so connected with the mechanism and arranged within the weight that when the weight is manually restored to its normal position, the spring will be re-wound.

A further object of the invention is to provide the weight with a pointer having connected therewith a bar so arranged with relation to a gravity operated member carried by the weight that when the weight reaches a position upon the scale beam which will cause the accurate balancing of the scale, the gravity operated member will be caused to contact with the bar and move the pointer into engagement with the scale beam, to prevent further movement of the weight under the influence of the mechanism for moving the same.

With these and other objects in view, the invention resides in the novel combination and arrangement of parts which will be hereinafter described and particularly pointed out in the claims.

The preferred embodiment of the invention has been illustrated in the accompanying drawing, although no restriction is necessarily made to the precise details of construction therein shown, as changes, alterations, and modifications, within the scope of the claims may be resorted to when desired.

Like characters of reference denote corresponding parts throughout the several views in the drawing, in which:

Figure 1 is a side elevation of the upper portion of a scale showing the improved weight applied to the beam thereof.

Fig. 2 is a side elevation partly in section showing the weight upon the scale beam and in its normal position.

Fig. 3 is a view similar to Fig. 2 showing the weight moved to a position upon the scale beam for causing the accurate balancing of the scale.

Fig. 4 is a vertical transverse sectional view on the line 4—4 of Fig. 2.

Fig. 5 is a horizontal sectional view on the line 5—5 of Fig. 2.

Referring now to the drawing in detail, the numeral 1 designates the upper portion of a scale having connected therewith the usual beam 2 graduated, as at 3, and notched on one side edge, as at 4, said beam also being supplied with the usual scale weights 5.

The numeral 6 designates the improved scale weight which may be used as a poise and comprises a body 7 to which is removably connected a weight box 8, said weight being constructed from any suitable material and in any shape desired although the preferred shape thereof has been embodied in the showing disclosed in the drawing.

The body 7 has extending longitudinally thereof a slot 9 opening out through the end of the body which is closed by the weight box 8, said slot being enlarged for a portion of its length, as at 10, above the portion of the slot adapted to receive the scale beam 3.

A shaft 11 extends transversely through the weight between the ends of the enlarged portion 10 and has mounted thereon a wheel 12 which supports the weight upon the scale beam and has its peripheral face provided with teeth 13 engageable with the notches 4 in the scale beam 3.

A clock spring 14 has one end connected with the shaft 11 and is wound thereabout and has its other end secured to a pin extending from one side wall of the enlarged portion of the slot 9, said spring normally exerting a tendency to cause the shaft 11 to rotate.

A slightly inclined trough 15 which is semi-circular in shape in cross section is arranged above the wheel 12 and at right-angles to the shaft 11, said trough receiving a ball 16.

A curved indicating arm 17 is arranged exteriorly of the scale weight 6 and has one end pivotally connected with the lower end of the trough 15 as indicated by the numeral 18, the other end of said indicating arm being adapted to normally engage with the notches 4 in the scale beam 3.

A head 19 is arranged in the trough 15 and is provided at opposite ends with arms 20 substantially triangular in shape in cross section to provide each arm with an inclined cam-face 21 adapted to engage a similar face 22 formed by notches 23 in the side walls of the trough 15.

A bar 24 extends laterally from the head 19 and is curved to extend beyond the lower end of the trough for hinged connection with the indicating arm 17 as shown at 25.

Through the above described arrangement of the head 19, bar 24, and indicating arm, it will be seen that when the head 19 is moved to a position in the trough 15 in which the arms 20 will be disposed in the notches 23, the indicating arm will be held free from engagement with the notched surface on the scale beam 3.

A cross-bar 26 is arranged at one side of the enlarged portion 10 of the slot 9 and has mounted thereon a roller 27 adapted to contact with the notched surface on the scale beam 3 to prevent tilting movement of the scale weight and allow the same to move freely over the beam when the shaft 11 is turned by the spring connected therewith and with the weight.

The weight of the scale weight 6 may be increased or diminished by the addition or the removal of shot from the weight box 8, thus adapting the weight for use upon different makes and types of scales.

When it is desired to use the weight in connection with a scale, the weight box 8 is removed from the body and the scale beam inserted in the slot 9 until the roller 27 and the teeth on the wheel 12 engage with the notched face on the bar. The weight box is now connected with the body and prevents the accidental removal of the weight from the beam 3.

The indicating arm 17 may now be raised until the arms 20 on the head 19 are received in the notches 23 in the trough 15.

The weight 6 is now moved toward the pivoted end of the beam 3, such movement rotating the shaft 11 against the influence of the spring 14 and increasing the tension exerted by the spring on the shaft 11.

When the weight reaches a position upon the beam in which the free end of the indicating arm will engage with the notch in the scale beam above the graduation marked 0, the end of the indicating arm is lowered to engage with the notch and with the weight in this position, the scale is ready for use.

Articles to be weighed may now be placed upon the scale and the required number of scale weights 5 connected with the beam 3, the indicating arm is raised to disengage the same from the beam 3, at which time the cam-face 21 will be brought into contact with the cam-face 22 in the trough and the indicating arm held in a raised position.

The spring 14 is now free to rotate the shaft 11 which causes the wheel 12 to turn and moves the weight toward the free end of the scale beam 3.

As the weight 6 approaches a point on the beam 3 at which the scales will accurately balance, the beam 3 begins to turn about its pivotal connection with the scale thus causing the arm 3 to assume a substantially horizontal position at which time the ball 16 under the influence of gravity is caused to roll in the trough 15 and to contact with the head 19, thereby releasing the arms 20 from the notches 23 in the trough and causing the bar 24 to move the indicating arm into a position to engage with the scale beam 3 and to hold the weight against further movement.

The person using the scale by looking at the graduation on the scale beam 3 beneath the notch in which is received the end on the indicating arm 17 can determine the weight of the article placed upon the scale.

The indicating arm may now be disengaged from the scale beam 3 and the weight moved to its normal position thus re-winding the spring 14 and restoring the ball 16 to its normal position, so that the weight 6 is again ready for use.

From the foregoing description, taken in connection with the accompanying drawing, it is at once apparent that a scale weight has been provided which may be used as a poise and which is so constructed that when the scale to which it is applied is in use, the weight will be automatically caused to travel to a position upon the scale beam which will insure the balancing of the scale.

Having thus described the invention, what is claimed as new, is:

1. A scale weight comprising a body, a spring controlled wheel carried by the body and engageable with a scale beam to move the scale weight along the same, an indicating arm carried by the body and engageable with the scale beam to act in opposition to said spring controlled wheel, and means controlled by the inclination of the scale beam for engaging said arm with the scale beam.

2. A scale weight comprising a body, a spring controlled wheel arranged within the body and having teeth engageable with the notches on the scale beam to move the scale weight along the same, an indicating arm carried by the body and engageable with the scale beam to act in opposition to the spring controlled wheel, and a gravity operated ball for engaging the indicating arm with the scale beam.

3. A scale weight comprising a slotted body, a spring controlled wheel arranged within the body and having teeth engageable with the notches on the scale beam to move the scale weight along the same, a gravity operated ball mounted to roll within the body, an indicating arm carried by the body and having an end for engagement with the notches on the scale beam, and operating mechanism for said arm connected therewith and arranged in the path of movement of said ball.

4. A scale weight comprising a slotted body for connection with a scale beam, a toothed wheel for contact with said beam arranged within said slot and operable to move said body along the scale beam, a spring for operating said wheel connected therewith and with the body, a trough arranged above the wheel, a ball mounted to roll in said trough, an indicating arm carried by the body and engageable with the scale beam to act in opposition to said wheel, and a rod connected with said arm and having a head arranged within said trough and in the path of movement of said ball.

5. A scale weight comprising a body slotted to receive a scale beam said slot being enlarged for a portion of its length, a spring operated wheel arranged within the enlarged portion of the slot to contact with the scale beam to move said body over the same, an inclined trough arranged above said wheel and provided with notches, an indicating arm carried by the body and engageable with the scale beam, a ball mounted to roll in said trough, a bar connected with the indicating arm and extending within said trough, a head connected with the bar, and arms on said head to be received in the notches in the trough.

In testimony whereof I affix my signature.

ALVIN WENZEL BARTHELD.

Copies of this patent may be obtained for five cents each, by addressing the "Commissioner of Patents, Washington, D. C."